United States Patent
Marchment et al.

(10) Patent No.: US 12,172,464 B2
(45) Date of Patent: Dec. 24, 2024

(54) RIM, RIM COMPONENT AND RIM ASSEMBLY FOR A BICYCLE WHEEL AND METHODS OF MANUFACTURE THEREOF

(71) Applicant: ITS Cycling Limited, Horsham (GB)

(72) Inventors: Thomas Marchment, Horsham (GB); Peter Marchment, Horsham (GB); Maria Luisa Grappone, Horsham (GB)

(73) Assignee: ITS Cycling Limited, Horsham (GB)

( * ) Notice: Subject to any disclaimer, the term of this patent is extended or adjusted under 35 U.S.C. 154(b) by 1009 days.

(21) Appl. No.: 17/046,678

(22) PCT Filed: Apr. 10, 2019

(86) PCT No.: PCT/GB2019/051041
§ 371 (c)(1),
(2) Date: Oct. 9, 2020

(87) PCT Pub. No.: WO2019/197828
PCT Pub. Date: Oct. 17, 2019

(65) Prior Publication Data
US 2021/0129581 A1 May 6, 2021

(30) Foreign Application Priority Data

Apr. 11, 2018 (GB) .................................... 1805993
Dec. 21, 2018 (GB) .................................... 1821075

(51) Int. Cl.
*B60B 21/02* (2006.01)
*B60B 21/04* (2006.01)
*B60B 21/06* (2006.01)

(52) U.S. Cl.
CPC .......... *B60B 21/025* (2013.01); *B60B 21/062* (2013.01); *B60B 21/026* (2013.01);
(Continued)

(58) Field of Classification Search
CPC ..... B60B 21/025; B60B 21/04; B60B 21/026; B60B 21/104
(Continued)

(56) References Cited

U.S. PATENT DOCUMENTS 4,275,932 A * 6/1981 Baird ...................... B60B 25/10
301/40.3
5,549,360 A * 8/1996 Lipeles .................... B60B 5/02
301/95.102
(Continued)

FOREIGN PATENT DOCUMENTS

CN 201511754 U 6/2010
CN 103660776 A 3/2014
(Continued)

OTHER PUBLICATIONS

Search and Examination Report issued for GB 1805993.1, Dated Sep. 20, 2018, 8 pages.
(Continued)

*Primary Examiner* — Jason R Bellinger
(74) *Attorney, Agent, or Firm* — Bochner PLLC; Andrew D Bochner

(57) ABSTRACT

A rim assembly for a bicycle wheel, comprising a rim having generally opposing first and second wall sections configured for mounting a bicycle tire, each of said first and second wall sections comprising an outwardly facing recess and; a rim component located in each recess, wherein each rim component has a lower density than the rim, wherein the rim components do not form part of a braking section of the bicycle wheel.

15 Claims, 11 Drawing Sheets

(52) U.S. Cl.
CPC ....... *B60B 21/04* (2013.01); *B60B 2360/3416* (2013.01); *B60B 2360/346* (2013.01); *B60B 2900/111* (2013.01); *B60Y 2200/13* (2013.01)

(58) Field of Classification Search
USPC ............. 301/95.101–95.104, 95.107, 95.108
See application file for complete search history.

(56) References Cited

U.S. PATENT DOCUMENTS

| | | | | |
|---|---|---|---|---|
| 5,820,709 | A * | 10/1998 | Matsuda | B60B 21/12 |
| | | | | 152/383 |
| 6,059,377 | A * | 5/2000 | Wu | B60B 21/025 |
| | | | | 301/95.102 |
| 6,106,075 | A * | 8/2000 | Suenaga | B60B 21/12 |
| | | | | 152/381.6 |
| 6,155,651 | A | 12/2000 | Mizata et al. | |
| 6,283,557 | B1 * | 9/2001 | Okajima | B60B 21/025 |
| | | | | 301/58 |
| 7,331,639 | B2 * | 2/2008 | Okajima | B60B 1/042 |
| | | | | 301/58 |
| 7,350,877 | B1 * | 4/2008 | Muraoka | B60B 21/04 |
| | | | | 301/58 |
| 7,377,595 | B1 * | 5/2008 | Okajima | B60B 1/041 |
| | | | | 301/58 |
| 9,216,611 | B2 * | 12/2015 | Schlanger | B60B 7/06 |
| 9,403,404 | B2 * | 8/2016 | Lin | B29C 70/86 |
| 9,428,006 | B2 * | 8/2016 | Martin | B60B 5/02 |
| 11,660,909 | B2 * | 5/2023 | Brady | B60B 1/003 |
| | | | | 301/95.104 |
| 2006/0181140 | A1 | 8/2006 | Mercat et al. | |
| 2006/0197369 | A1 | 9/2006 | Chiu et al. | |
| 2007/0029868 | A1 * | 2/2007 | Chen | B60B 25/00 |
| | | | | 301/95.104 |
| 2011/0018336 | A1 * | 1/2011 | Mercat | B60B 7/01 |
| | | | | 301/95.104 |
| 2014/0167384 | A1 | 6/2014 | Chuang | |
| 2014/0167492 | A1 | 6/2014 | Tho | |
| 2015/0224820 | A1 * | 8/2015 | Teixeira | B60B 21/04 |
| | | | | 152/514 |
| 2017/0050464 | A1 | 2/2017 | Teixeira | |
| 2017/0166005 | A1 | 6/2017 | Lin et al. | |

FOREIGN PATENT DOCUMENTS

| | | |
|---|---|---|
| CN | 203793025 U | 8/2014 |
| CN | 204774373 U | 11/2015 |
| CN | 204774374 U | 11/2015 |
| DE | 102006029468 A1 | 2/2007 |
| EP | 1688272 A2 | 8/2006 |
| EP | 3272557 A1 | 1/2018 |
| JP | H0732806 A | 2/1995 |
| JP | H07329198 A | 12/1995 |
| TW | 201336698 A | 9/2013 |
| TW | M526504 U | 8/2016 |
| WO | 2015123403 A2 | 8/2015 |
| WO | 2018044773 A1 | 3/2018 |

OTHER PUBLICATIONS

Search and Examination Report issued for GB 1821075.7, Dated Aug. 15, 2019, 6 pages.
Search and Examination Report issued for GB 1821075.7, Dated Dec. 16, 2020, 5 pages.
International Search Report and Written Opinion issued for PCT/GB2019/051041, Dated Oct. 17, 2019, 14 pages.
Examination Report of Taiwan Intellectual Property Office in related Taiwanese Patent Appl. TW108112695, dated Apr. 12, 2023, 35 pages.

* cited by examiner

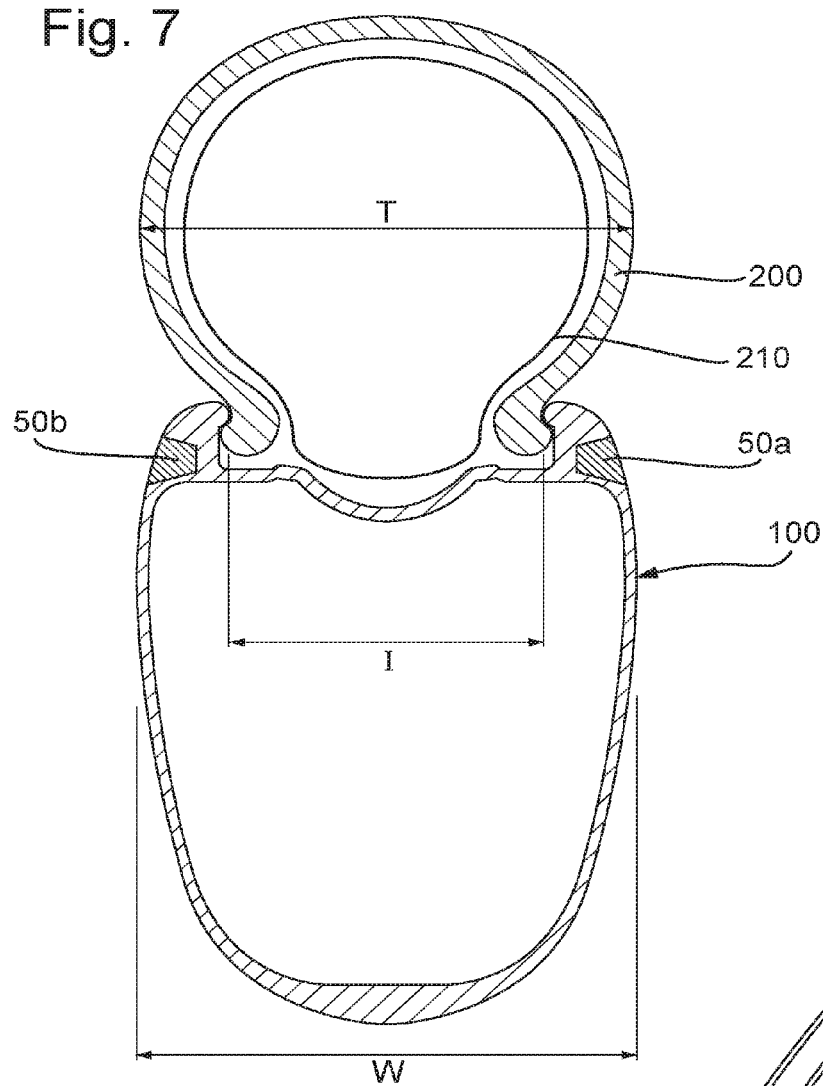
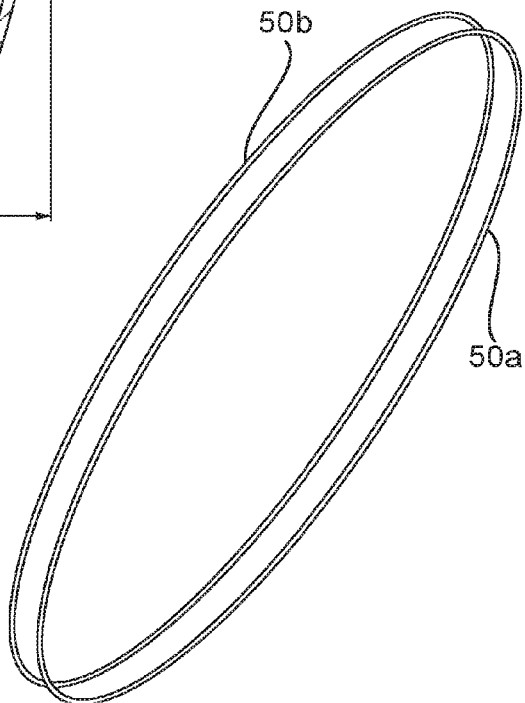

RIM, RIM COMPONENT AND RIM ASSEMBLY FOR A BICYCLE WHEEL AND METHODS OF MANUFACTURE THEREOF

FIELD OF THE INVENTION

This invention relates to a rim and rim assembly for a bicycle wheel and associated methods of manufacture. The invention also relates to a wheel for a bicycle.

BACKGROUND TO THE INVENTION

A traditional bicycle wheel comprises a rim, a hub and a plurality of spokes, with the spokes connecting the hub to the rim. A bicycle tyre is mounted to the rim, using either a clincher, tubular or tubeless configuration. The wheel is mounted to a bicycle frame at the hub.

A recent focus in wheel rim technology concerns aerodynamic efficiency, with the shape of the rim affecting the flow of air over its surface. More specifically, the focus has been directed to the combination of the rim and the mounted tyre, with efforts being made to reduce the aerodynamic drag resulting from the combination of the rim and tyre, therefore allowing riders to maintain higher speeds.

FIG. 1 is a schematic cross section of a traditional rim for a bicycle wheel. The rim 1 is shown having a tyre 200 mounted thereon using a clincher configuration. The rim 1 comprises first 3 and second 5 opposing sidewalls; a tyre-mounting portion 10 and a spoke attachment portion 7. The spoke attachment portion 7 comprises a plurality of through holes (not shown) such that spokes may be attached to the rim. The spoke attachment portion 7 is situated at a radially inner portion of the rim, and the tyre-mounting portion is located at a radially outer portion of the rim. The space between the opposing first and second sidewalls is typically hollow.

The tyre-mounting portion 10 comprises opposing first 11 and second 12 wall sections extending around the outer circumference of the rim. The first and second wall sections form a part of the first and second sidewalls of the rim. The first and second wall sections 11, 12 each comprise inwardly facing hooks 11a, 12a configured to retain the tyre beads 201 of a clincher tyre 200 (or tubeless tyre).

An inner tube 210 is located within the mounted clincher tyre 200 and is inflated with air in order to inflate the tyre to the desired pressure. The nominal width of the tyre when installed and inflated is illustrated by the dimension T in FIG. 1.

Rolling resistance testing for road bicycle tyres indicates that wider tyres (i.e. larger "T") typically have a lower rolling resistance when used in non-perfect "real-world" conditions on open roads. Typical tyre width values for such "wider" tyres may be between 25 mm and 40 mm. Such wider tyres are also generally more comfortable for the rider. The use of wider tyres for road bicycles is a relatively recent trend, in contrast to more traditional road bicycle tyre widths of 19 mm to 23 mm.

However, when mounting such a wider tyre to a bicycle rim (as shown in FIG. 1), the tyre tends to extend outwardly ("bulge") with respect to the external width of the rim (indicated at W). This "light bulb" shape adopted by the mounted tyre causes both aerodynamic and handling issues. Firstly, as the width of the tyre T is substantially greater than the outer width of the rim W, this causes an increase in aerodynamic drag which negates any improvements in rolling resistance gained by using a wider tyre. Secondly, the "bulging" of the tyre with respect to the rim can cause lateral movement of the tyre during use, especially when cornering, leading to adverse handling characteristics.

In order to overcome these issues, bicycle rim manufacturers have started manufacturing "wider" rims, with the outer rim width W being increased in response the more commonly used wider tyre widths T. However, a further consideration that must be taken into account when manufacturing a rim is its internal width ("I"), which is the distance between the first and second wall sections 11, 12 of the tyre-mounting portion 10.

The internal width of the rim defines the tyre shape when mounted, by "squeezing" the tyre beads together. Therefore, in general, in order to obtain a desired situation where the width of the inflated tyre T does not bulge substantially outwardly from the rim (a desired situation for aerodynamic efficiency is where the width of the installed tyre is substantially equal to or less than the external width of the rim), it is desirable to increase the difference between the external width W and the internal width I of the rim as compared to traditional rim shapes.

However, this necessarily requires thicker wall sections of the rim, particularly in the tyre-mounting portion of the rim. Thicker wall sections require the use of an increased amount of material in manufacturing the rim, leading to heavier rims. Heavier rims are particularly undesirable due to the increased rotational moment of inertia of the final bicycle wheel, which can cause sluggish acceleration and reduced performance.

SUMMARY OF THE INVENTION

In accordance with a first aspect of the invention there is provided a rim assembly for a bicycle wheel, comprising: a rim configured to receive a rim component in an external surface thereof, and; a rim component located in the external surface of the rim, wherein the rim component forms part of the external surface of the rim, and wherein; the rim component has a lower density than the rim.

The inventors have realised that, by providing a rim assembly comprising a rim and a rim component where the rim component has a lower density than the rim, then the complete rim assembly will be lighter than if the rim was not configured to receive such a rim component. This has particular benefits when manufacturing wider rims which, as described above in the background section, require thicker wall sections as a result of the internal rim width considerations. The rim assembly according to the first aspect of the invention allows wider rims to be manufactured—with the associated aerodynamic and handling advantages—with minimal weight penalty.

The rim assembly is preferably a unitary member, here meaning that the rim and rim component are integrally connected. The rim assembly may be laced to a hub using a plurality of spokes in order to form a wheel for a bicycle.

The rim assembly according to the invention has particular application in wheels for use with disc brakes, as the material of the rim component may typically be positioned where a conventional braking surface for a rim brake would be. Thus, preferably, the rim component does not form part of a braking section of the rim assembly. In other words, the rim component is preferably used in order that the shape and weight of the rim assembly may be favourably manipulated, rather than to improve braking performance using conventional rim brakes.

Thus, preferably, the rim assembly is configured for a wheel for use with disc brakes. However, the rim component may be located at a location spaced from a braking surface for a rim brake and in such an instance the rim assembly may be used in wheels for rim brakes.

The rim component is typically bonded to the rim, but other methods of coupling the rim component to the rim are envisaged, such as the use of a flange, or a friction fit interface. In the case where the rim component is bonded to the rim to form the rim assembly, this is preferably performed during a moulding process.

In such a rim assembly, the rim component forms part of the external surface of the rim. Preferably, the rim component sits "flush" to the external surface of the rim. Typically an exposed surface of the rim component forms a part of the external surface of the rim.

The rim component may in general be formed of any material having a lower density than that of the rim. The material of the rim component may have a self-supporting (preferably unitary) form when it is inserted into the external surface of the rim. Alternatively or additionally, the rim component material (or a portion thereof) may have a mouldable ("soft") form when it is inserted into the external surface of the rim. Such a material is preferably curable. For example, the rim may comprise a recess in an external surface thereof, with a mouldable material used to fill the recess such that the exposed surface of the rim component material forms a part of the external surface of the rim. An example of such a mouldable material used to form the rim component is a (preferably curable) epoxy resin. The epoxy resin may be in the form of an epoxy adhesive or epoxy filler.

Preferably, the rim component comprises a foam material. Such a foam material comprises a plurality of gas-filled voids. In general, foam rim components can be manufactured from a number of thermoset and thermoplastic polymers such as polyvinyl chloride (PVC), polyurethane (PU), polystyrene (PS), styrene acrylonitrile (SAN), polyetherimide (PEI) and polymethacrylimide (PMI) such as a PMI isotropic rigid foam. The rim component is preferably manufactured from a thermoset polymer such as an epoxy resin. A particularly preferred material for the rim component is a Bisphenol A (BPA) type closed cell foam. Herein, the term "comprises" includes "comprises only of". In other words, the rim component may consist essentially of a foam material, e.g. a closed cell foam.

Other materials that may be used for the rim component include, for example, rubber and plastic materials that have a lower density than the rim. Typically, the rim component does not comprise carbon fibre composite.

The rim component may be referred to as an insertable rim component.

In preferred embodiments, the rim comprises a recess in an external surface thereof, preferably wherein the rim component is located in said recess. The rim component preferably substantially completely fills the recess such that it sits "flush" with the external surface of the rim. The recess may have a substantially triangular, trapezoidal, rectangular or hemispherical (e.g. approximately semi-circular) geometry.

Typically, the recess has a depth of between 0.5 mm and 4 mm, preferably between 2 mm and 4 mm. Here, by "depth" we mean an inwardly extending dimension, e.g. substantially perpendicular to a median plane of the rim assembly (which is its plane of symmetry perpendicular to the axis of rotation).

The recess may have a radial dimension of between 1 mm and 25 mm, preferably between 2 mm and 10 mm, and more preferably between 2 mm and 5 mm.

Typically, the rim may comprise one or more recesses, wherein a rim component is located within each of the one or more recesses, each rim component forming part of the external surface of the rim. Each of the one or more recesses may have the features described herein.

The rim may typically comprise opposing external surfaces, each opposing external surface comprising a recess wherein the recesses are symmetrically arranged (e.g. about the median plane of the rim assembly), preferably wherein a rim component is located in each recess such that each rim component forms part of the external surface of the rim.

Typically, the rim of such a rim assembly has an external width in the range of 20 mm to 50 mm, preferably 23 mm to 30 mm; and an internal width in the range of 13 mm to 29 mm, preferably 17 mm to 25 mm. A preferred configuration has an internal width of 23 mm and an external width of 28 mm. Here, the external width is measured at the maximum width of the rim. Typically this is at the tyre mounting portion, but dependent on the design of the rim shape (for aerodynamic purposes for example), may be positioned at a radially different location to the tyre mounting portion.

In embodiments, the rim assembly may further comprise a layer of protective material (e.g. resin, varnish or paint layer) applied to an external surface of the rim component.

The rim may be made of any material, such as composite (e.g. carbon fibre composite) or metal material, or a combination of both, but is typically formed of carbon fibre composite.

In accordance with a second aspect of the invention there is provided a rim for a bicycle wheel, the rim configured to receive (e.g. a material for forming) an (e.g. insertable) rim component in an external surface thereof, wherein, when inserted, the insertable rim component forms part of the external surface of the rim. As is known in the art, such a rim for a bicycle wheel is substantially annular in shape, and typically comprises first and second opposing side walls, a tyre mounting portion and a spoke mounting portion.

Such a rim may be configured to form a rim assembly of the first aspect of the invention. Thus, the following description also relates to the rim of the first aspect of the invention.

The inventors have realised that, if an insertable rim component is inserted into an external surface of the rim, and if the rim component is comprised of material having a lower density than the material of the rim, then the complete rim assembly (i.e. the rim and insertable rim component) will be lighter than if the rim was not configured to receive such a rim component.

This has particular benefits when manufacturing wider rims which, as described above in the background section, require thicker wall sections as a result of the internal rim width considerations. The rim according to the first aspect of the invention allows wider rims to be manufactured—with the associated aerodynamic and handling advantages—with minimal weight penalty.

The term "external surface" is used here to mean a surface of a rim in isolation (i.e. with no tyre mounted thereon) that is exposed to the surrounding atmosphere. In other words, when an insertable rim component is inserted, at least a part of the rim component is exposed to the surrounding atmosphere.

Preferably, the external surface is an outwardly facing surface, for example an outwardly facing surface of a sidewall of the rim. The term "outwardly" in this context is used to mean a surface of the rim that is exposed to the surrounding atmosphere when a tyre is mounted to the rim. This may be an external surface of a tyre-mounting portion of the rim. However, the external surface may be an inwardly-facing external surface or radially-facing external surface of the rim (e.g. as a part of a tyre-mounting portion of the rim that is not exposed when a tyre is mounted).

The rim is configured such that, when inserted, the insertable rim component forms part of an external surface of the rim. In other words, when inserted, the rim component conforms with, and preferably sits flush with, the external surface of the rim surrounding the rim component.

The rim may be made of any material, such as composite or metal material, or a combination of both, but is typically manufactured substantially completely from carbon fibre composite. Sheets of pre-impregnated ("pre-preg") carbon fibre—meaning that the carbon fibres are already arranged within a matrix of resin such as epoxy—are typically arranged in a suitable mould and cured in order to form the rim. It is important that the sheets of pre-preg are bonded together in a reliable manner in order to establish the strength and integrity of the rim. The rim being configured to receive an insertable rim component in an external surface of the rim advantageously means that the bonding of the pre-preg sheets to each other can be readily controlled, as the rim component will not be fully enveloped by pre-preg sheets.

The use of an external surface of the rim for receipt of the rim component also advantageously provides increased flexibility in the positioning of such a rim component.

In preferred embodiments, the rim comprises a recess in an external surface thereof, said recess configured to receive an insertable rim component. Typically, an inserted rim component substantially completely fills the recess such that the exposed surface of the rim component forms a part of the external surface of the rim. The recess is provided as an indentation in the external surface of the rim, and may be in the form of a "groove" or a "slot".

In general, the recess may be located at any position in an external surface of the rim. In preferred embodiments, the rim comprises substantially opposing external surfaces, at least one of said substantially opposing external surfaces comprising a recess. Preferably, the rim comprises opposing recesses in opposing external surfaces in order that the complete rim rotates "in true", i.e. with minimal lateral deviation. Preferably, the recess(es) of the rim are symmetrical about its median plane (which is its plane of symmetry perpendicular to the axis of rotation) and symmetric about the axis of rotation.

Preferably, the rim comprises at least one substantially annular recess in at least one external surface thereof. Particularly preferably the rim comprises substantially opposing annular recesses in opposing external surfaces. Here the term "annular recess" is used to describe the shape of the recess when viewed from a direction parallel to the axis of rotation of the rim. Such an annular recess may be described as circumferentially extending. Such annular recess(es) are beneficial as they are relatively straightforward to form whilst simultaneously allowing a relatively large (lower density) rim component to be inserted. Furthermore, such annular recess(es) are rotationally symmetric about the rim's axis of rotation, ensuring good rotation of the finished wheel However, other recess geometries and locations are envisaged, for example the rim may comprise a plurality of discrete recesses in at least one external surface thereof. Such a plurality of recesses may be radially or circumferentially spaced and preferably exhibit rotational symmetry about the rim's axis of rotation. In such an embodiment the plurality of recesses are configured to receive a corresponding plurality of insertable rim components.

Preferably, the rim comprises opposing first and second wall sections, each of said first and second wall sections comprising an external surface, and wherein at least one of said first and second wall sections comprises a recess in its external surface. Typically such first and second wall sections are configured for mounting a bicycle tyre. It is particularly advantageous to locate the recesses in wall portions configured for mounting a bicycle tyre, since these wall portions will typically be the thickest portions of the rim (and hence requiring the most material), due to the requirements of the internal rim width and the secure mounting of a tyre.

The recess may in general have any cross sectional geometry (when viewed from a direction perpendicular to an axis of rotation of the rim). However, preferably the recess(es) is configured to receive an insertable rim component having a substantially triangular, trapezoidal, rectangular or hemispherical (e.g. approximately semi-circular) cross-sectional geometry.

An insertable rim component that may be inserted into an external surface of the rim may in general be formed of any material having a lower density than that of the rim. The material of the insertable rim component may have a self-supporting (preferably unitary) form when it is inserted into the external surface of the rim. Alternatively or additionally, the rim component material (or a portion thereof) may have a mouldable ("soft") form when it is inserted into the external surface of the rim. Such a material is preferably curable. For example, the rim may comprise a recess in an external surface thereof, with a mouldable material used to fill the recess such that the exposed surface of the rim component material forms a part of the external surface of the rim. An example of such a mouldable material is a (preferably curable) epoxy resin. The epoxy resin may be in the form of an epoxy adhesive or epoxy filler.

The insertable rim component material may then be cured within (e.g. together with) the rim by the application of heat so as to undergo cross-linking and hardening.

A particularly preferred material for the rim component is a Bisphenol A (BPA) type closed cell foam.

In accordance with a third aspect of the invention, there is provided a method of manufacturing a rim assembly for a bicycle wheel, the method comprising: providing a rim configured to receive a rim component in an external surface thereof, and; inserting material for forming a rim component into the external surface of the rim such that the inserted material for forming the rim component forms part of the external surface of the rim, wherein said material for forming the rim component has a lower density than the rim.

The rim component material may have a self-supporting (preferably unitary) form when it is inserted into the external surface of the rim. Alternatively or additionally, the rim component material (or a portion thereof) may have a mouldable ("soft") form when it is inserted into the external surface of the rim. Such a material is preferably curable. For example, the rim may comprise a recess in an external surface thereof, with a mouldable rim component material used to fill the recess such that the exposed surface of the rim component material forms a part of the external surface of the rim.

Preferably, the method further comprises curing the material for forming the rim component within (e.g. together with) the rim, preferably by the application of heat. This is typically performed in a mould defining the desired outer surface of the rim assembly. Thus, preferably, the material for forming the rim component is a curable material such as a curable polymer. An example of such a material for forming the rim component is an epoxy resin, which may be in the form of an epoxy adhesive or epoxy resin. When cured, the material forms a foam structure such that the formed rim component comprises a foam material. The rim component may comprise only of (e.g. consist essentially of) a foam material. A particularly preferred material for the rim component is a BPA type closed cell foam.

Preferably, the rim comprises a recess in an external surface thereof, preferably wherein the material for forming the rim component is inserted into the recess so as to substantially completely fill the recess. The rim may be formed by conventional methods, such as a closed mould process or filament winding, for example. In preferred embodiments, the step of providing a rim comprises assembling (e.g. arranging) rim material in a mould shaped for a rim comprising a recess in an external surface thereof, and preferably curing the rim material within the mould. Such a mould will typically have a protrusion (e.g. ridge) corresponding to the recess to be formed within the external surface of the rim.

Preferably, the rim material is a composite material, preferably carbon fibre composite.

In some embodiments, a layer of protective material (e.g. resin, varnish or paint layer) may be applied to the external surface of the material for forming the rim component in order to protect it from damage.

The method of the third aspect of the invention may be adapted to manufacture a rim assembly according to the first aspect of the invention. Typically, the rim that is provided is a rim according to the second aspect of the invention. Thus, the rim that is provided may have any of the features discussed above in relation to the first and second aspects of the invention.

In accordance with a fourth aspect of the invention there is provided a bicycle wheel comprising a rim or rim assembly according to the invention.

In accordance with a fifth aspect of the invention there is provided a mould for a bicycle rim, adapted for providing a rim and/or a rim assembly according to the invention.

In accordance with a sixth aspect of the invention there is provided an insertable rim component for a bicycle wheel rim, the rim component configured to be insertable in an external surface of a rim for a bicycle wheel such that, when inserted, the rim component forms part of the external surface of the rim, and wherein the rim component has a lower density than the rim. As explained above, the use of such an insertable rim component having a lower density than the rim component advantageously allows the width of a rim to be increased with minimal weight penalty Preferably, the insertable rim component is configured to cooperate with a recess located in an external surface of a rim for a bicycle wheel.

The insertable rim component may in general have any cross-sectional geometry. However, preferably the insertable rim component has a substantially triangular, trapezoidal, rectangular or hemispherical cross-sectional geometry. As outlined above, a preferred recess configuration for a rim is that the recess is substantially annular. In such a case, the insertable rim component is preferably substantially annular and adapted to cooperate with the annular recess of the rim. The insertable rim component may be self-supporting.

The insertable rim component has a lower density than the rim, and can in general be formed of any material exhibiting this property. Preferably, the insertable rim component comprises a foam material. In general, foam insertable rim components can be manufactured from a number of thermoset and thermoplastic polymers such as polyvinyl chloride (PVC), polyurethane (PU), polystyrene (PS), styrene acrylonitrile (SAN), polyetherimide (PEI) and polymethacrylimide (PMI) such as a PMI isotropic rigid foam. Preferably the insertable rim component is a BPA type closed cell foam.

Further disclosed herein is a rim assembly for a bicycle wheel, comprising: a rim according to the second aspect of the invention, and; a rim component located in an external surface of the rim, wherein the rim component forms part of the external surface of the rim, and wherein; the rim component has a lower density than the rim.

Such a rim assembly has particular application in wheels for use with disc brakes, as the material of the rim component may typically be positioned where a conventional braking surface for a rim brake would be. However, the rim component may be located at a location spaced from a braking surface for a rim brake and in such an instance the rim assembly may be used in wheels for rim brakes.

The rim component is typically bonded to the rim, but other methods of coupling the rim component to the rim are envisaged, such as the use of a flange, or a friction fit interface. In the case where the rim component is bonded to the rim to form the rim assembly, this is preferably performed during the moulding process of the rim. For example, sheets of carbon fibre pre-preg may be assembled in a mould to form a rim having a recess in an external surface thereof. The rim component may then be located within the recess within the mould and bonded to the sheets of pre-preg within the mould during the moulding process. This may be performed during a curing process. In other embodiments, the rim component may be bonded to the rim after the moulding process.

In such a rim assembly, an exposed surface of the rim component forms a part of the external surface of the rim. Preferably, the rim component sits "flush" to the external surface of the rim.

The rim component material may have a self-supporting (preferably unitary) form when it is inserted into the external surface of the rim. Alternatively or additionally, the rim component material (or a portion thereof) may have a mouldable ("soft") form when it is inserted into the external surface of the rim. An example of such a mouldable material is a (preferably curable) epoxy resin. The epoxy resin may be in the form of an epoxy adhesive or epoxy filler.

The rim component may be an insertable rim component according to the sixth aspect of the invention.

Typically, the rim of such a rim assembly has an external width in the range of 20 mm to 50 mm, and an internal width in the range of 13 mm to 29 mm. A preferred configuration has an internal width of 23 mm and an external width of 28 mm. Here, the external width is measured at the maximum width of the rim. Typically this is at the tyre mounting portion, but dependent on the design of the rim shape (for aerodynamic purposes for example), may be positioned at a radially different location to the tyre mounting portion.

Further disclosed herein is a method of manufacturing a rim assembly for a bicycle wheel, comprising: providing a rim according to the second aspect, and; inserting (e.g. material for forming) a rim component into an external surface of the rim such that the inserted (e.g. material for forming the) rim component forms part of the external surface of the rim, wherein said rim component has a lower density than the rim. The rim component may be an insertable rim component according to the second aspect of the invention. The rim may be formed by conventional methods, such as a closed mould process or filament winding, for example.

The rim component material may have a self-supporting (preferably unitary) form when it is inserted into the external surface of the rim. Alternatively or additionally, the rim component material (or a portion thereof) may have a mouldable ("soft") form when it is inserted into the external surface of the rim. Such a material is preferably curable. For example, the rim may comprise a recess in an external surface thereof, with a mouldable rim component material used to fill the recess such that the exposed surface of the rim component material forms a part of the external surface of the rim. The rim component material may then be cured within (e.g. together with) the rim by the application of heat.

Further disclosed herein is a method of manufacturing a rim assembly for a bicycle wheel, comprising: assembling rim material in a mould shaped for a rim according to the second aspect; arranging (e.g. material for forming) a rim component within an external surface of the rim material within the mould such that the rim component forms part of an external surface of the rim, and; curing the rim material and (e.g. material for forming the) rim component within the mould such that the rim component is bonded to the rim material within the mould. This method of manufacturing a rim assembly is particularly advantageous as the rim component is integrally formed with the rim during the moulding process.

The rim component material may have a self-supporting form. Alternatively or additionally, the rim component material (or a portion thereof) may have a mouldable ("soft") form such as an epoxy resin.

Preferably, the rim material is a composite material, preferably carbon fibre composite. In such a method, sheets of carbon fibre pre-preg are typically assembled in the mould along with the rim component, with the rim component bonded to the sheets of pre-preg within the mould during the moulding process.

In alternative implementations, it is envisaged that the rim material may be arranged so as to surround a (preferably self-supporting) rim component within the mould such that the rim component forms a part of the external surface of the rim.

Further disclosed herein is a rim assembly for a bicycle wheel, comprising a rim main body formed of a first material, and a rim component located in an external surface of the rim main body, wherein the rim component forms part of the external surface of the rim main body, and wherein; the rim component is formed of a second material having a lower density than the first material. The material of the rim component may have a self-supporting form when it is inserted into the external surface of the rim main body. The material of the rim component may have a mouldable ("soft") form when it is inserted into the external surface of the rim main body. Such a material is preferably curable. For example, the rim main body may comprise a recess in an external surface thereof, with a mouldable material used to fill the recess such that the exposed surface of the rim component material forms a part of the external surface of the rim main body. An example of such a mouldable material is a (preferably curable) epoxy resin. The epoxy resin may be in the form of an epoxy adhesive or epoxy filler.

Further disclosed herein is a method of manufacturing a rim assembly for a bicycle wheel, comprising: providing a rim comprising a recess in an external surface thereof; substantially completely filling the recess of said rim with insert material such that the insert material forms part of the external surface of the rim, the insert material having a density lower than the rim, and preferably; curing the insert material within the rim to form the rim assembly.

The insert material may have a mouldable ("soft") form (examples include epoxy resins such as epoxy adhesives or epoxy fillers). Alternatively or additionally, the insert material (or a portion thereof) may have a self-supporting form. The curing is preferably a heat cure.

In some embodiments, a layer of protective material (e.g. resin, varnish or paint layer) may be applied to the external surface of the insert material of the rim assembly in order to protect it from damage.

The material of the (insertable) rim component of any of the above aspects has a lower density than the rim, and can in general be formed of any material exhibiting this property. The material may comprise a foam material. In general, foam rim components can be manufactured from a number of thermoset and thermoplastic polymers such as polyvinyl chloride (PVC), polyurethane (PU), polystyrene (PS), styrene acrylonitrile (SAN), polyetherimide (PEI) and polymethacrylimide (PMI) such as a PMI isotropic rigid foam. Other examples of materials that may be used to form a rim component according to the invention include (preferably curable) epoxy resins such as epoxy adhesives or epoxy fillers.

BRIEF DESCRIPTION OF THE DRAWINGS

The invention will now be described in relation to the appended drawings, in which:

FIG. 7 is a schematically illustrates a bicycle tyre mounted to a rim assembly according to the invention;

FIG. 8 illustrates example insertable rim components according to the invention;

DETAILED DESCRIPTION

Figure 2:
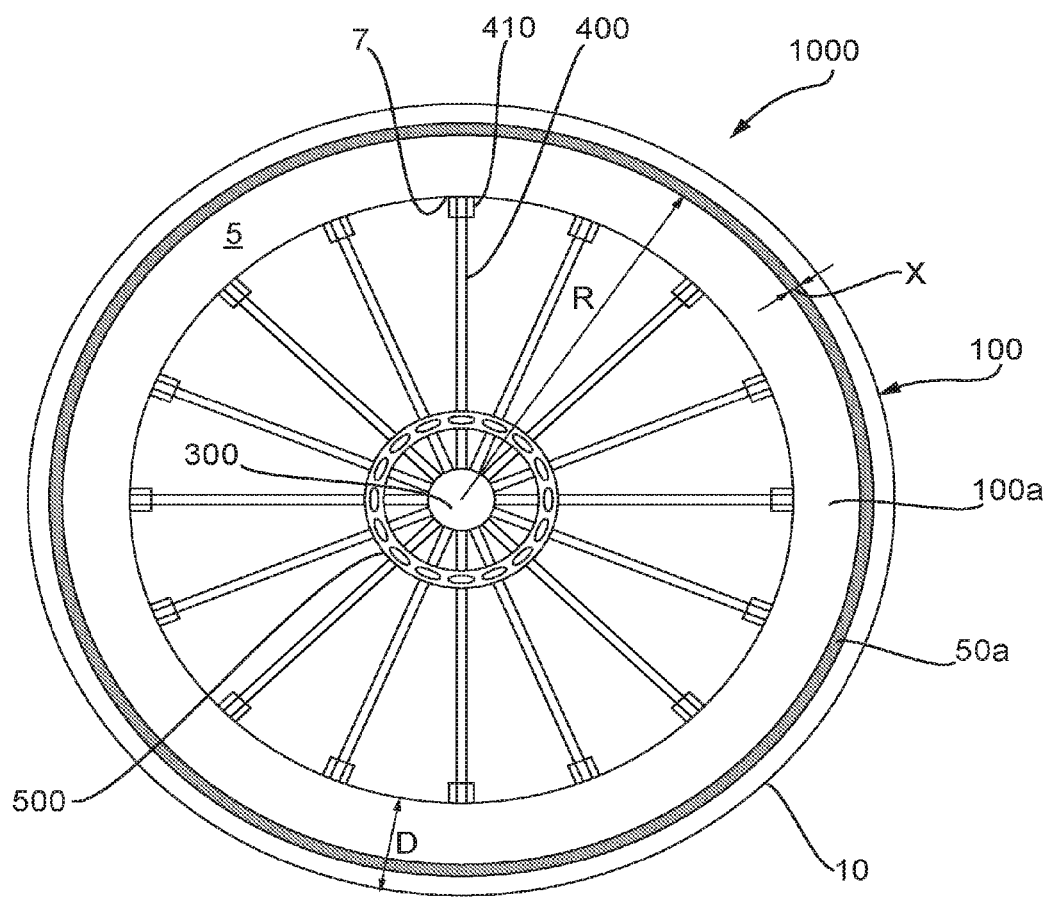
FIG. 2 is a schematic side view of a bicycle wheel comprising a rim assembly according to an embodiment of the invention.

FIG. 2 is a schematic side view of a bicycle wheel 1000 comprising a rim assembly 100, the rim assembly being according to an embodiment of the present invention. The rim assembly 100 comprises a rim 100a and an insertable rim component 50a located in an external surface of the rim 100 such that the rim component 50a forms part of the external surface of the rim. For ease of description, the insertable rim component may simply be referred to as an "insert" in the remainder of the description.

The wheel 1000 is shown without a tyre mounted on it. As can be seen, the rim 100a is substantially annular in shape, and has a depth "D" which is the distance between the radially inner and radially outer portions of the rim. A tyre (which could be a clincher tyre, tubular tyre or tubeless tyre) is mounted to the radially outer tyre-mounting portion 10 of the rim.

The wheel also comprises a hub 300 and a plurality of spokes 400 (typically between 16 and 36) connecting the hub to the rim. Each spoke is attached to a spoke engaging portion 7 of the rim, located at the radially inner portion of the rim. Each spoke typically comprises a threaded section and is attached to the spoke engaging portion 7 through the use of a nipple 410. The wheel 1000 has an axis of rotation extending through the centre of the hub 300 into the plane of the paper.

In this example the wheel 1000 comprises a disc brake rotor 500 mounted on the hub 300. When the wheel is mounted to a bicycle frame, a brake calliper attached to the bicycle frame may engage with the rotor in order to slow the bicycle.

The rim 100a comprises a first sidewall 5. A substantially annular recess 20a is formed in an outwardly-facing external surface of sidewall 5 (see FIG. 4), the recess extending circumferentially around the rim at a radius R as seen in FIG. 2. The recess 20a has a radial dimension ("width") x of between 1 mm and 25 mm, preferably between 2 mm and 10 mm, more preferably between 2 mm and 5 mm, and most preferably 3.4 mm. A corresponding recess is formed in the outwardly-facing external surface of opposing sidewall 3 of the rim 100a.

Figure 3:
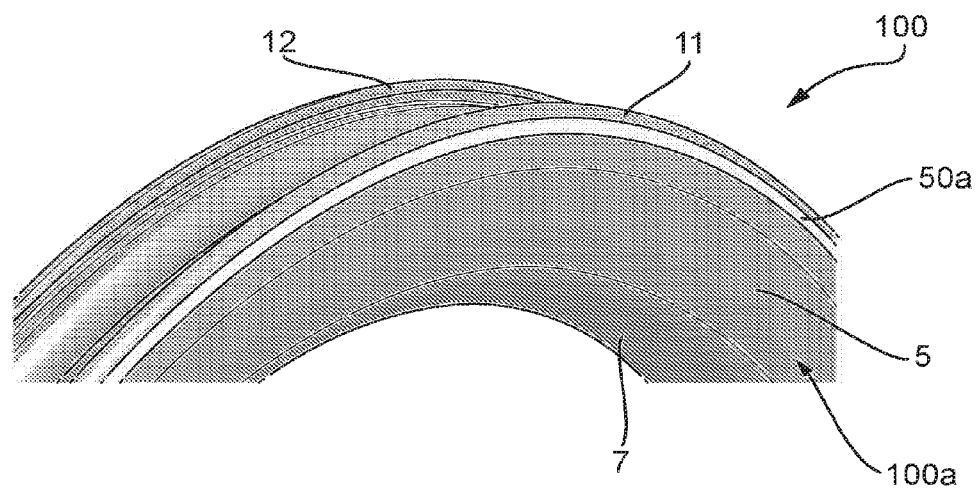
FIG. 3 is a perspective view of a part of a rim assembly according to the invention.

The recess 20a is substantially filled with an insert 50a (see FIG. 3) such that the exposed (outer) surface of the insert 50a substantially conforms with the external surface of the sidewall 5 of the rim 100a. The insert 50a has a lower density than the material forming the rim 100a, and therefore the complete rim assembly 100 advantageously has a reduced weight compared to if the recess and insert were not present.

The rim 100a may be formed of any material. For example, composite materials (e.g. carbon fibre composite), metal alloy (e.g. aluminium alloy) and/or any other materials may be used. Combinations of materials may be used—for example part of the rim 100a may be formed from carbon fibre composite and part may be formed from aluminium. In this particular embodiment, the rim 100a is a unitary member formed of carbon fibre composite.

The insert is typically a foam material comprising a plurality of gas-filled voids, and in this embodiment is a polymethacrylimide (PMI) isotropic rigid foam having a density of 0.4 g/cm$^3$, with high strength, modulus and heat resistance. Other suitable low density insert materials may be used, including honeycomb structures. The insert material is typically bonded to the rim 100a in order to form the complete rim assembly 100, although other means of coupling the insert material to the rim are envisaged, for example a flange component located around the circumference of the recess 20a, or a friction fit between the rim 100a and the insert.

The insert may be formed of any material having a density lower than that of the rim. The insert may be provided as a unitary member shaped to cooperate with the corresponding recess. Alternatively or additionally, the material used to form the insert may have a mouldable ("soft") form when it is used to fill the recess 20a. An example of such a mouldable material is an epoxy resin.

Figure 5:
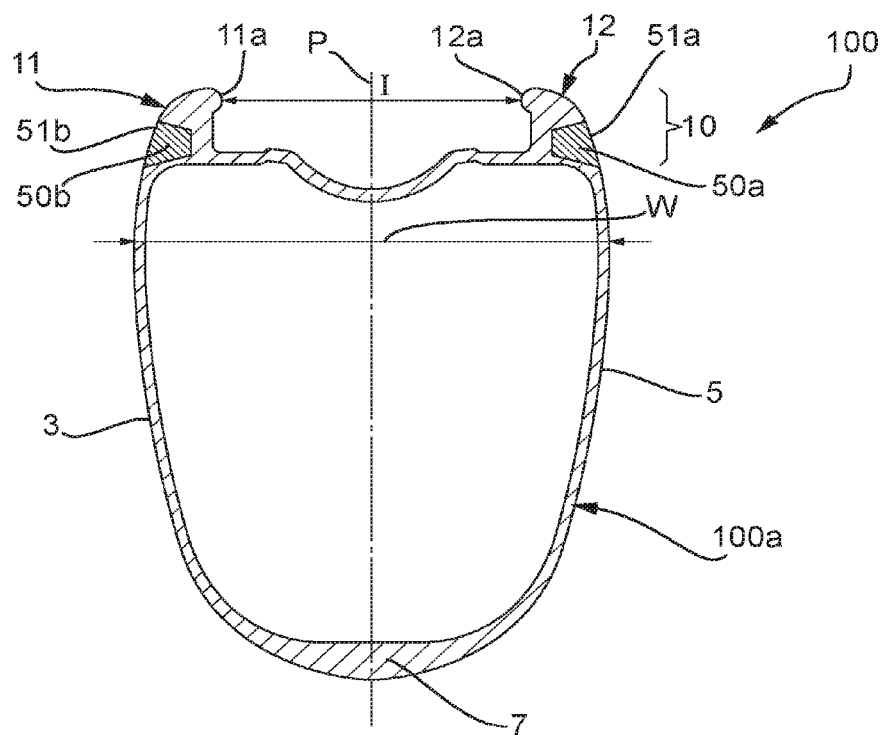
FIG. 5 is a cross-sectional view of a rim assembly according to the invention.

FIG. 5 is a cross sectional view through the rim assembly 100, showing the rim 100a and the inserts 50a and 50b. As was described above, the sidewall 3 opposing the sidewall 5 visible in FIG. 2 comprises a corresponding recess 20b (see FIG. 6) in its outwardly facing external surface. The recesses 20a, 20b are symmetrically located about the median plane (P) of the rim, which is the plane perpendicular to the axis of rotation that bisects the rim. This ensures correct balancing of the rim assembly 100 when the insert is present.

Figure 6:
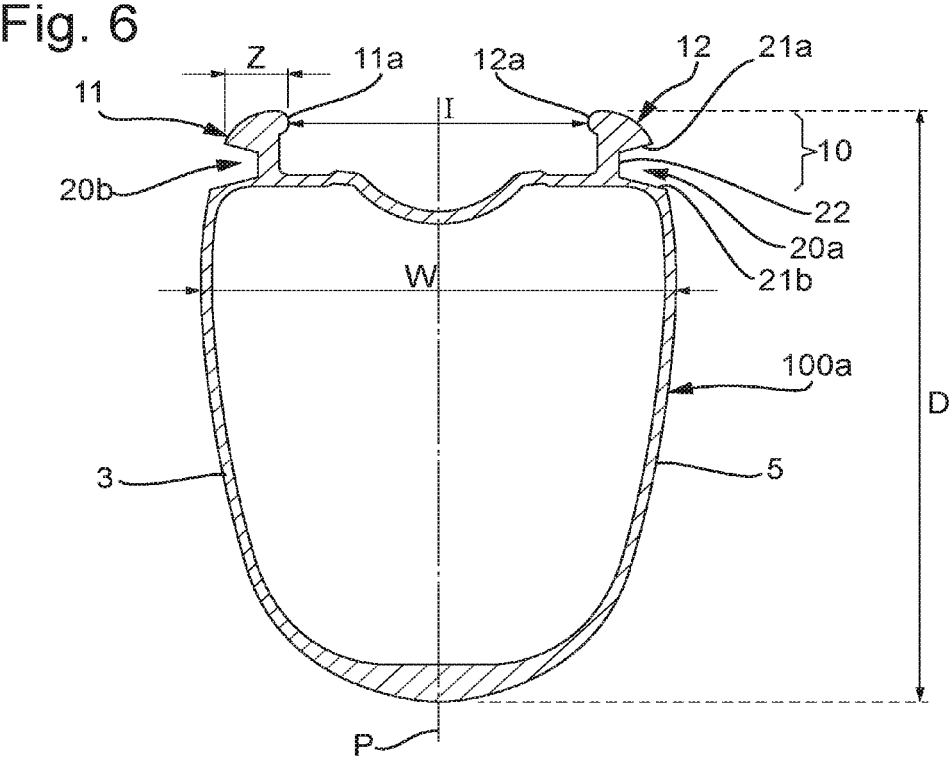
FIG. 6 is a cross-sectional view of a rim according to the invention.
Figure 9:
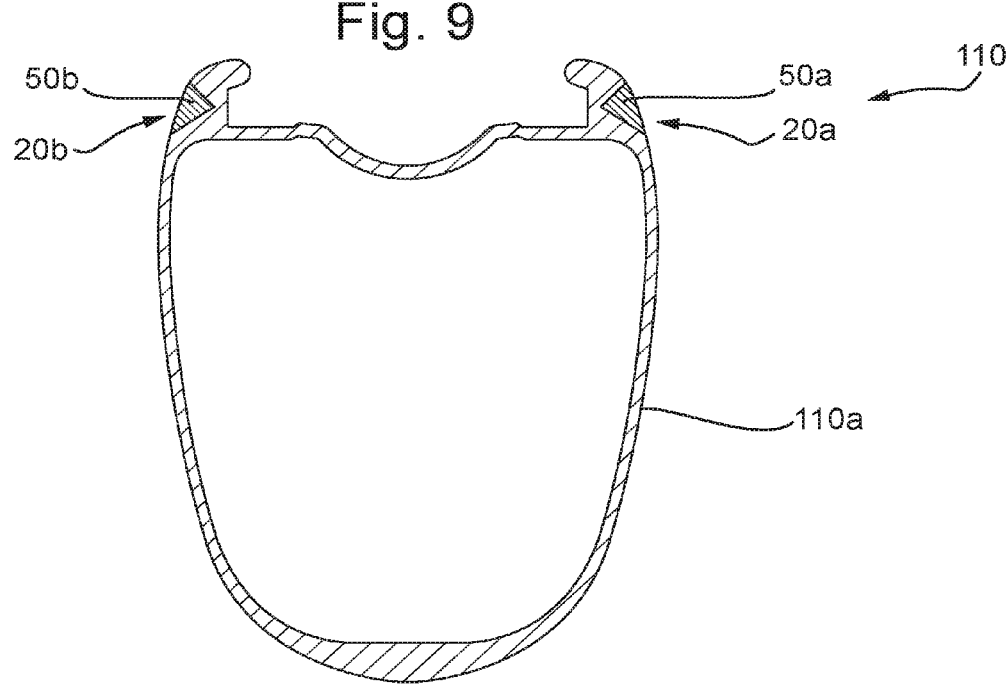
FIGS. 9 to 13 schematically illustrate example recess and insertable rim component geometries that may be used in the invention.
Figure 10:
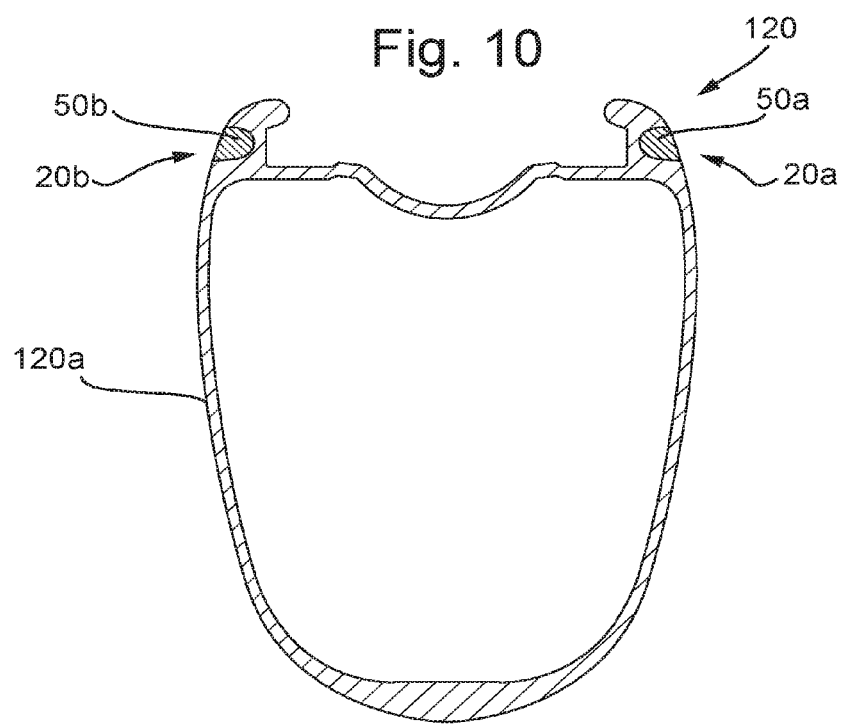

As can be seen in FIGS. 5 and 6 (FIG. 6 showing the rim 100a without the insert material), the recesses 20a, 20b are configured to receive inserts 50a, 50b having a substantially trapezoidal cross-section. In other words, when viewed in cross section as in FIGS. 5 and 6, each recess 20a, 20b comprises two substantially inwardly extending surfaces (shown at 21a, 21b) and one substantially radially extending surface 22. However, other recess cross-sectional geometries are envisaged, as shown in FIGS. 9 and 10.

As can be seen in FIG. 5, the inserts 50a, 50b substantially completely fill the respective recesses 20a, 20b such that when the inserts are coupled to the rim 100a, the exposed outer surface of the inserts (shown at 51a, 51b) substantially conform with the external surface of the rim. In this embodiment, the inserts sit "flush" with the external surface of the rim 100a.

In the presently described embodiment, the recesses 20a, 20b are located in the wall sections 11, 12 of the tyre mounting portion 10 of the rim. For the purposes of this disclosure, these first and second wall sections 11, 12 form a part of the first and second sidewalls of the rim. The recesses find particular benefit when located in these wall sections, due to the restraints on the internal width of the rim I which were discussed in the background to the invention section. The use of the inserts having a lower density than that of the rim 100a advantageously allows the external width W of the rim to be increased with minimal weight penalty. Typical widths z of the wall sections 11, 12 (see FIG. 6) are in the range of 1 mm to 5 mm. The recesses typically have a depth (i.e. an inwardly extending dimension) greater than 0.5 mm and less than 4 mm, preferably between 2 mm and 4 mm.

Figure 17:
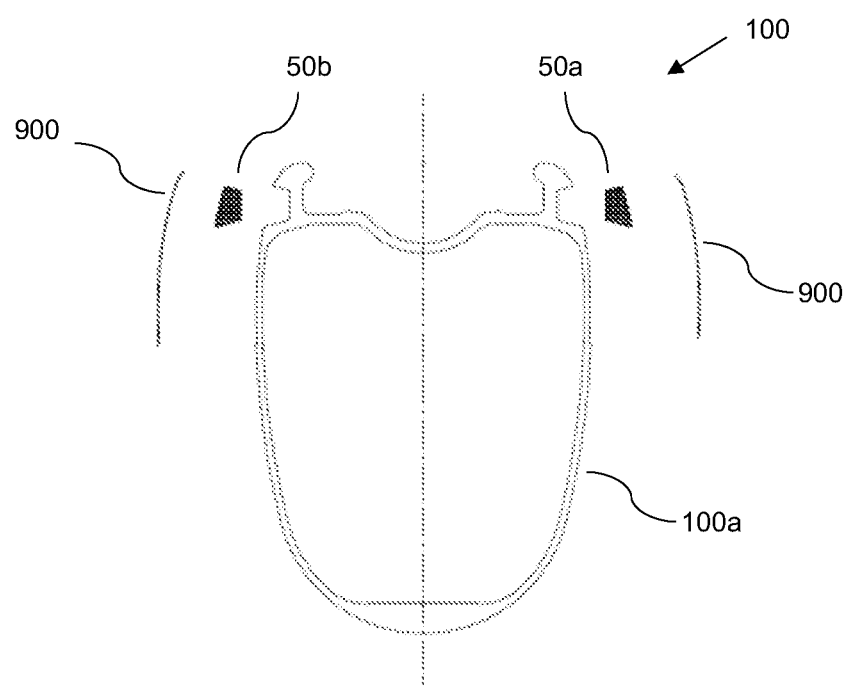
FIG. 17 is a schematic cross-sectional view of a rim assembly according to an embodiment of the invention.

In embodiments, the rim assembly may further comprise a layer of protective material 900 (e.g. resin, varnish or paint layer) applied to an external surface of the rim component in order to protect it from damage. Such an embodiment is schematically illustrated in FIG. 17.

Figure 1:
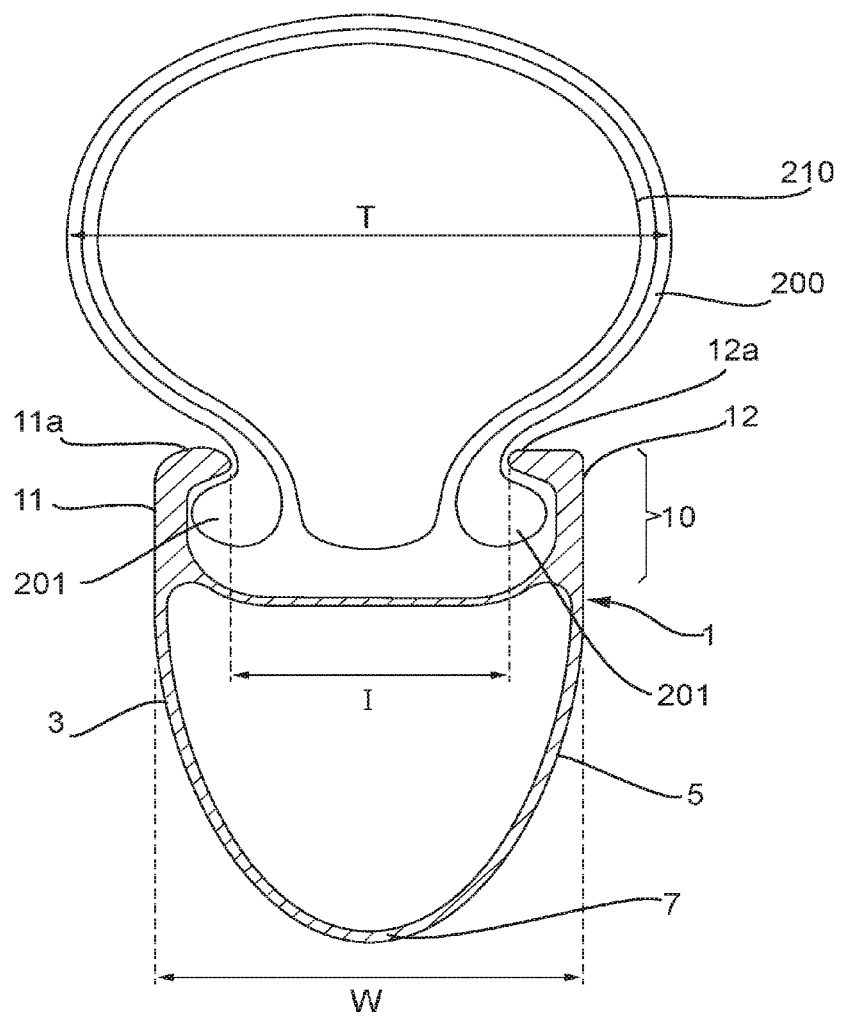
FIG. 1 schematically illustrates a bicycle tyre mounted to a conventional rim.

FIG. 7 schematically illustrates a tyre 200 mounted to a rim assembly 100 according to the presently described embodiment of the invention. In this embodiment, the rim 100 is suitable for attachment of clincher tyres, as shown in FIG. 7 where an inner tube 210 is also present. However, it will be appreciated that the rim may be suitable for other tyre mounting configurations such as tubeless and tubular set ups. As can be seen in FIG. 7, the width of the installed tyre, T, is much more closely aligned with the maximum external width, W, of the rim 100 compared to FIG. 1. The use of the wider rim in this context allows for improved aerodynamic and handling characteristics as have been discussed above, while the use of the inserts 50a, 50b installed within respective recesses 20a, 20b in rim 100a allows for the increased external width of the rim (constrained by the internal width I) with minimal weight penalty.

Typical internal rim widths I that may be used in this invention are in the range of 13 mm to 29 mm, with the external width (measured at the maximum external width) of the rim typically being in the range of 20 mm to 50 mm. In a particularly preferred configuration, the internal width I is 19 mm and the external width W is 27 mm. The depth D of the rim is typically between 10 mm and 80 mm, preferably between 30 mm and 60 mm.

As can be seen in FIG. 7, in this embodiment the maximum external width of the rim, W, is located at a radially inner section of the rim as compared to the tyre mounting portion. However, the width of the rim at the tyre mounting portion is also increased as compared to conventional rims. In other embodiments, the maximum external width of the rim may be at the tyre-mounting portion or other radial locations of the rim between the tyre-mounting portion and the spoke engaging portion.

In this embodiment, as explained in relation to FIG. 2, the rim assembly 100 is designed for use on a disc brake wheel, as the inserts 50a, 50b are located where the braking surfaces for a conventional rim-brake rim would typically be located. However, it is envisaged that in other embodiments, the recess(es) in the rim 100a and the corresponding insert(s) could be positioned at a location spaced from the brake tracks, and that such a rim could be used with rim brake callipers.

The rim 100a is preferably made entirely of carbon fibre composite material. Sheets of pre-impregnated ("pre-preg") carbon fibre—meaning that the carbon fibres are already arranged within a matrix of resin such as epoxy—may be arranged in a suitable mould and cured in order to form the rim 100a. In one embodiment the insert material is subsequently bonded to the rim 100a after it has been removed from the mould. In the example rim 100 seen in FIGS. 2 to 7, the inserts may be formed as unitary substantially annular components, as seen in FIG. 8, having the required geometry to fit, and substantially completely fill, the recesses 20a and 20b in the rim 100a. The insert material may then be bonded to the rim 100a within the recesses.

In an alternative method, the insert(s) may be placed in the mould with the carbon fibre lay-up, such that the insert material is bonded to the rim 100a within the mould and during the moulding process.

In any of the examples discussed herein, the insertable rim component ("insert material") may be formed from a material having a soft mouldable form when it is inserted into the recess(es) of the rim. In such cases the insert material is preferably cured within the rim (e.g. together with the rim) in order to form the rim assembly.

In the example rim 100 described so far, the recesses 20a, 20b were configured to receive respective inserts having a substantially trapezoidal cross-sectional geometry. However, other cross-sectional geometries of recess and corresponding insert are envisaged, as seen in FIGS. 9 and 10. FIG. 9 illustrates an example rim assembly 110 comprising a rim 110a having recesses 20a, 20b configured to receive inserts having a substantially triangular cross-sectional geometry, while FIG. 10 illustrates an example rim assembly 120 having recesses 20a, 20b in its rim 120a configured to receive inserts having a substantially hemispherical cross-sectional geometry.

Figure 11:
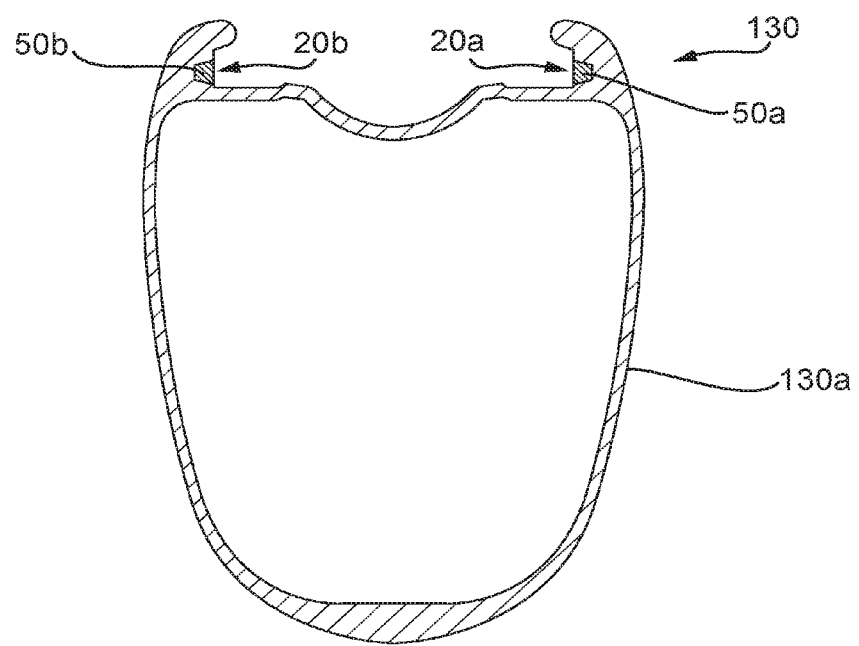

FIG. 11 illustrates an example rim assembly 130 wherein the recesses 20a, 20b are formed on an inwardly-facing external surface of the rim 130a. More specifically, in this example the recesses 20a, 20b and associated inserts are located on the internally facing external surfaces of the wall sections 11, 12.

Figure 12:
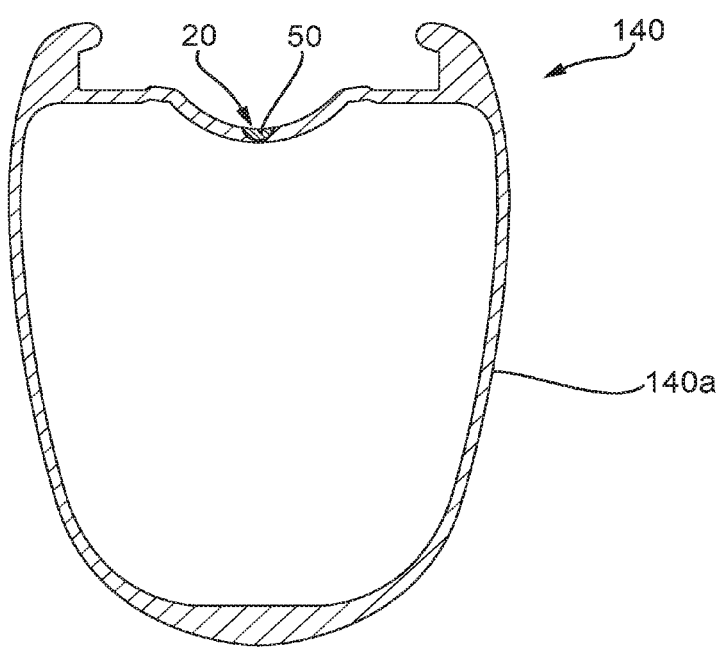

FIG. 12 shows an example rim assembly 140 comprising a single recess 20 located in an external radially facing surface of the tyre mounting portion 10. The recess 20 extends circumferentially around the rim and is symmetrical about the median plane P of the rim. Such a recess as seen in FIG. 12 still allows a wider bicycle wheel rim with reduced weight as less material is required to form the rim 140 compared to if the recess and insert were not present.

Figure 13:
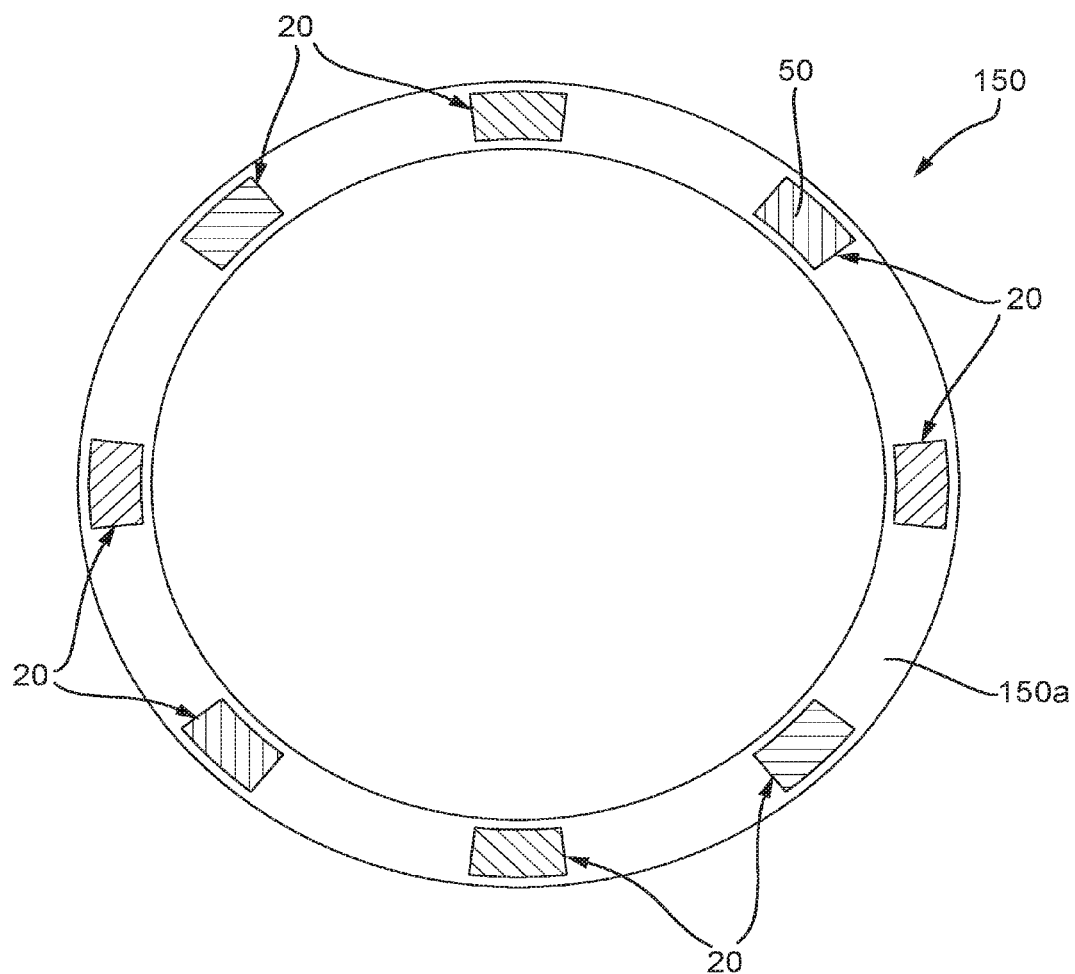

FIG. 13 illustrates a side view of a bicycle rim assembly 150 according to a further embodiment of the invention, where the external surface of the rim 150a comprises a plurality of discrete recesses 20 spaced circumferentially around the rim. The recesses and associated inserts 50 are preferably located symmetrically about the circumference of the rim such that the rim assembly exhibits rotational symmetry about its axis of rotation.

Figure 14:
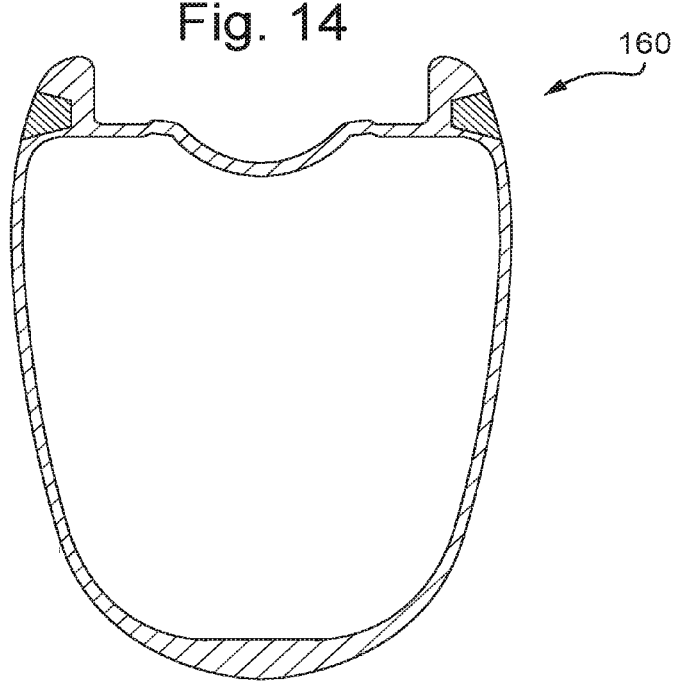
FIG. 14 illustrates a cross section of a hookless rim.

The embodiments described so far have been in relation to rims configured for clincher or tubeless configurations wherein the wall sections 11, 12 of the tyre mounting portion 10 of the rim comprise inwardly facing hooks 11a, 12a. In other the embodiments, the rim may be "hookless", where the wall portions 11, 12 do not comprise the inwardly extending hook portions. This is shown in the rim assembly 160 illustrated in FIG. 14.

Figure 15:
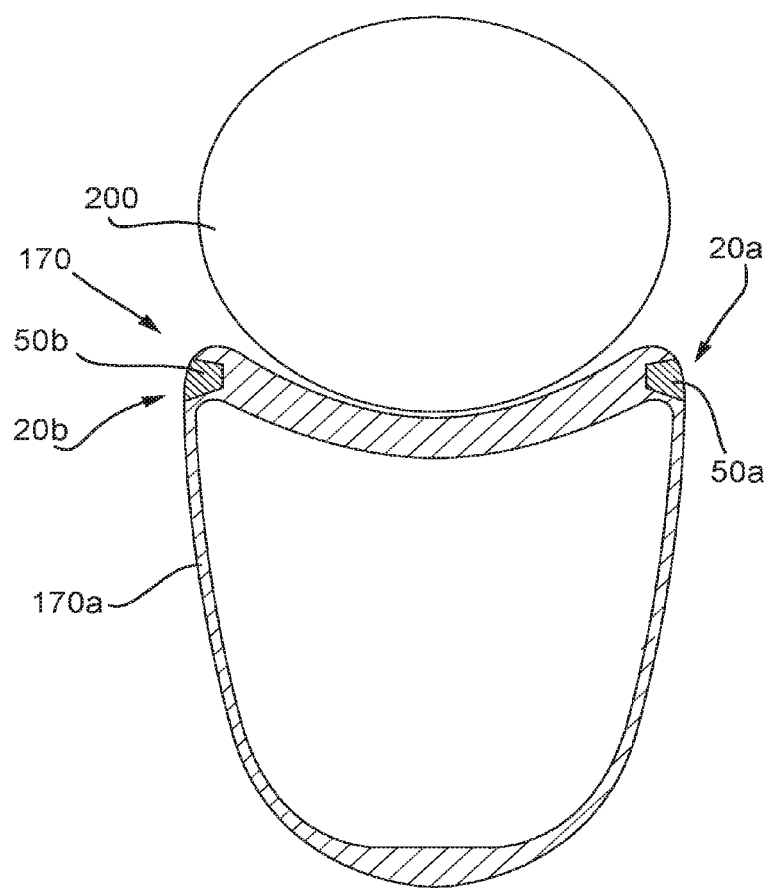
FIG. 15 illustrates a cross section of a rim suitable for mounting tubular tyres.

In a further embodiment, a rim assembly 170 may be configured for the mounting of a tubular tyre, where the tyre is glued or taped onto the radially outer tyre-mounting portion of the rim 170a, as schematically shown in FIG. 15. Although such a rim configured for tubular tyres does not comprise wall sections 11, 12 at the tyre-mounting portion, the rim 170a comprises recesses 20a, 20b in outwardly-facing external surfaces, and corresponding inserts 50a, 50b in order to advantageously reduce weight.

Figure 4:
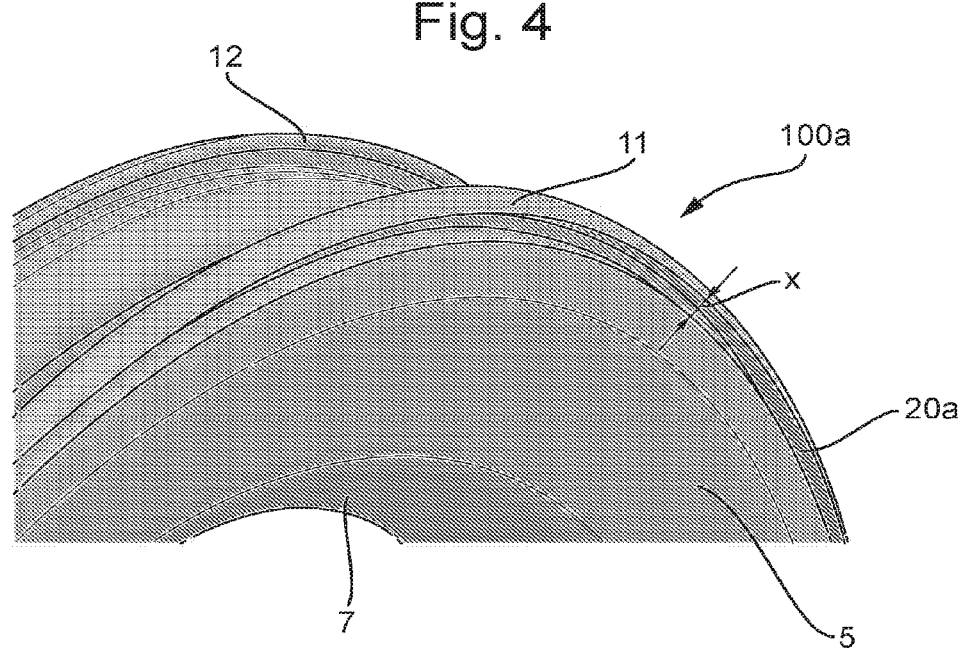
FIG. 4 is a perspective view of a part of a rim according to the invention.

A preferred method of manufacturing a rim assembly for a bicycle wheel will now be described. In a first step, a rim having a recess in an outwardly-facing external surface of a sidewall (for example as illustrated in FIG. 4) is provided. This rim may be made using standard procedures. One example of making such a rim is by hand lay-up of pre-preg carbon fibre sheets on a pre-form mould which has a ridge corresponding to the recess to be formed within the rim. The rim is then cured within the mould.

In a second step, a curable mouldable insert material (typically an epoxy resin) is inserted into the recess of the rim, typically so as to substantially completely fill the recess. In other words, the curable material sits "flush" with the external surface of the rim.

In a third step, the rim and insert material are placed into a second mould defining the desired outer surface of the rim assembly. The rim and insert material are then cured together within the second mould by the application of heat (typically in the range of 100 C to 200 C, preferably 120 C to 150 C).

The rim that is provided in the first step may have one or more recesses, and may have various different geometries and positons on the rim, as have been described above with reference to the figures.

Figure 16:
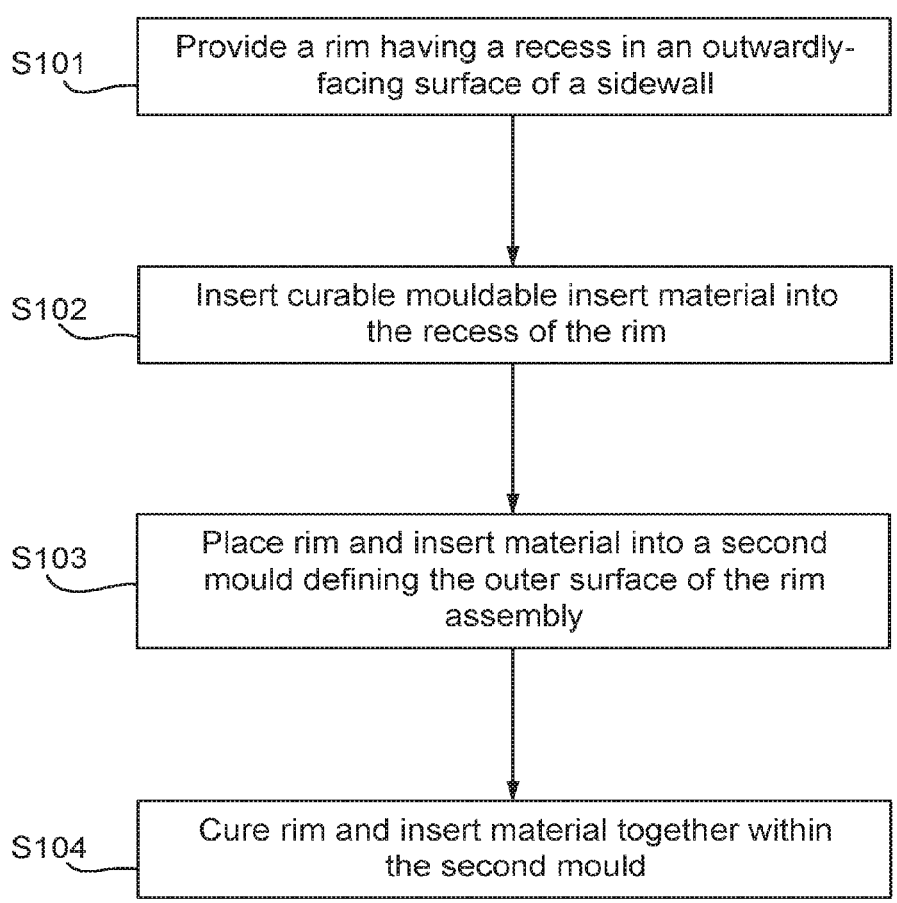
FIG. 16 is a flow diagram outlining the steps of a preferred method for forming a rim assembly according to the invention.

FIG. 16 is a flow diagram outlining the steps of the above described preferred method of manufacturing a rim assembly. The first step of providing a rim having a recess in an outwardly-facing surface of a sidewall is shown at step S101. Step S102 illustrates the second step of inserting a curable mouldable insert material into the recess of the rim, typically so as to completely fill the recess. The third step of placing the rim and insert material into a second mould defining the outer surface of the rim assembly is shown at step S103. The curing of the rim and insert material together within the second mould is illustrated at step S104.

The invention claimed is:

1. A rim assembly for a bicycle wheel, comprising:
a rim having generally opposing first and second wall sections configured for mounting a bicycle tire, each of said first and second wall sections comprising an outwardly facing recess;
a rim component located in each recess,
wherein each rim component has a lower density than the rim,
wherein the rim components do not form part of a braking section of the bicycle wheel; and
a layer of protective material applied to an external surface of the rim components.

2. The rim assembly of claim 1, wherein the rim components comprise a foam material.

3. The rim assembly of claim 2, wherein the foam material is a closed cell foam material.

4. The rim assembly of claim 1, wherein at least one of said recesses is substantially annular.

5. The rim assembly of claim 1, wherein the rim component has a substantially triangular, trapezoidal, rectangular or hemispherical cross-sectional geometry.

6. The rim assembly of claim 1, wherein each recess has a depth of between 0.5 mm and 4 mm.

7. The rim assembly of claim 1, wherein each recess has a radial dimension of between 1 mm and 25 mm.

8. The rim assembly of claim 1, wherein the rim components are bonded to the rim.

9. The rim assembly of claim 1, wherein the rim has an external width in the range of 20 mm to 50 mm and an internal width in the range of 13 mm to 29 mm.

10. The rim assembly of claim 1, wherein the rim is formed of carbon fibre composite.

11. A method of manufacturing a rim assembly for a bicycle wheel, the method comprising:
arranging rim material in a mould shaped for a rim comprising generally opposing first and second wall sections configured for mounting a bicycle tire, each of said first and second wall sections comprising an outwardly facing external surface, and wherein each of said first and second wall sections comprises a recess forming part of the outwardly facing external surface of the rim;
arranging material for forming a rim component into each said recess such that the material conforms with the external surface of the rim surrounding the material;
curing the rim material and material for forming the rim components within the mould such that the rim components are bonded to the rim material within the mould,
wherein the rim components do not form part of a braking section of the bicycle wheel; and
applying a layer of protective material to the external surface of the material for forming the rim component.

12. The method of claim 11, wherein the rim material is carbon fibre composite.

13. The method of claim 11, wherein the material for forming the rim component is an epoxy resin.

14. A bicycle wheel comprising a rim assembly according to claim 1.

15. A rim assembly for a bicycle wheel, comprising:
a rim configured to receive a rim component in an external surface thereof;
a rim component located in the external surface of the rim,
wherein the rim component forms part of the external surface of the rim,
wherein the rim component has a lower density than the rim, and
wherein the rim components do not form part of a braking section of the bicycle wheel; and
a layer of protective material applied to an external surface of the rim components.

* * * * *